(12) United States Patent
Cheng et al.

(10) Patent No.: US 8,781,035 B2
(45) Date of Patent: Jul. 15, 2014

(54) METHODS AND SYSTEMS FOR IMPROVING RETRANSMISSION PERFORMANCE OF DATA CHANNELS IN A WIRELESS COMMUNICATION

(75) Inventors: Mingxia Cheng, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 200 days.

(21) Appl. No.: 13/343,460

(22) Filed: Jan. 4, 2012

(65) Prior Publication Data

US 2012/0177153 A1  Jul. 12, 2012

Related U.S. Application Data (60) Provisional application No. 61/430,898, filed on Jan. 7, 2011.

(51) Int. Cl.
*H04L 27/06* (2006.01)

(52) U.S. Cl.
USPC ........... 375/341; 375/314; 375/340; 375/346; 375/219; 375/220; 375/259; 375/260; 375/262; 375/261

(58) Field of Classification Search
CPC .... H04L 1/1845; H04L 1/1812; H04L 1/1835
USPC ......... 375/341, 314, 340, 346, 219, 220, 259, 375/260, 262, 261
See application file for complete search history.

(56) References Cited

U.S. PATENT DOCUMENTS

| | | | |
|---|---|---|---|
| 7,158,482 B2 * | 1/2007 | Love et al. ..................... | 370/252 |
| 7,574,645 B2 | 8/2009 | Pan et al. | |
| 8,156,407 B2 * | 4/2012 | Franovici ..................... | 714/776 |
| 8,433,968 B2 * | 4/2013 | Gotman et al. ............... | 714/751 |
| 2002/0049068 A1 | 4/2002 | Koo et al. | |
| 2003/0097629 A1 * | 5/2003 | Moon et al. ................... | 714/751 |
| 2003/0118031 A1 * | 6/2003 | Classon et al. ........... | 370/395.54 |
| 2003/0217319 A1 * | 11/2003 | Tripathi et al. ............... | 714/751 |
| 2005/0235190 A1 * | 10/2005 | Miyazaki et al. ............. | 714/748 |
| 2007/0263739 A1 * | 11/2007 | Garrett et al. ................. | 375/260 |
| 2008/0065944 A1 * | 3/2008 | Seol et al. ..................... | 714/748 |
| 2008/0107054 A1 | 5/2008 | Parts et al. | |
| 2008/0232403 A1 * | 9/2008 | Tsai et al. ..................... | 370/473 |
| 2008/0276147 A1 * | 11/2008 | Gho et al. ..................... | 714/748 |
| 2009/0086657 A1 * | 4/2009 | Alpert et al. .................. | 370/310 |
| 2009/0100310 A1 * | 4/2009 | Yoo et al. ..................... | 714/748 |
| 2009/0168920 A1 * | 7/2009 | Chen ............................. | 375/295 |
| 2010/0223534 A1 | 9/2010 | Earnshaw et al. | |
| 2011/0066912 A1 | 3/2011 | Riess et al. | |
| 2011/0173508 A1 * | 7/2011 | Wehinger ...................... | 714/748 |

OTHER PUBLICATIONS

International Search Report and Written Opinion—PCT/US2012/021249—ISA/EPO—Jun. 8, 2012.

* cited by examiner

*Primary Examiner* — Kenneth Lam
(74) *Attorney, Agent, or Firm* — Patterson & Sheridan, L.L.P.

(57) ABSTRACT

Certain aspects of the present disclosure provide a system and method for improving performance of HARQ operation in a wireless communication system. The proposed method enables a receiver to update a receive buffer only if newly received values corresponding to a data packet are more reliable than previous values corresponding to the same data packet (that are stored in the receive buffer). The receiver may use the more reliable information (e.g., the newly received values or the previously stored values) for decoding.

20 Claims, 8 Drawing Sheets

METHODS AND SYSTEMS FOR IMPROVING RETRANSMISSION PERFORMANCE OF DATA CHANNELS IN A WIRELESS COMMUNICATION

CLAIM OF PRIORITY UNDER 35 U.S.C. §119

The present application for patent claims priority to U.S. Provisional Application No. 61/430,898, entitled, "Data Channel Retransmission Performance," filed Jan. 7, 2011, and assigned to the assignee hereof, which is hereby expressly incorporated by reference herein.

TECHNICAL FIELD

Aspects of the present disclosure generally relate to wireless communication systems, and more particularly to improving retransmission performance in data channels with hybrid automatic repeat request (HARM).

BACKGROUND

Wireless communication networks are widely deployed to provide various communication services such as voice, video, packet data, messaging, broadcast, and the like. These wireless networks may be multiple-access networks capable of supporting multiple users by sharing the available network resources. Such multiple access networks support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or base stations that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grow with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

Certain aspects of the present disclosure provide a method for wireless communications. The method generally includes generating a first plurality of values based on a received data packet, combining the first plurality of values with a second plurality of values to generate a plurality of combined values, wherein the plurality of combined values are stored in a first buffer and the second plurality of values are stored in a second buffer, determining reliability of the plurality of combined values and the second plurality of values based on a reliability metric, overwriting the second buffer with the plurality of combined values if the plurality of combined values are more reliable than the second plurality of values, and decoding values stored in the second buffer to determine a plurality of decoded bits corresponding to the received data packet.

Certain aspects of the present disclosure provide a method for wireless communications. The method generally includes generating a first plurality of values based on a received data packet, combining the first plurality of values with a second plurality of values to generate a plurality of combined values, wherein the plurality of combined values are stored in a first buffer and the second plurality of values are stored in a second buffer, decoding the plurality of combined values to determine a first energy metric and a plurality of decoded bits corresponding to the received data packet, and if the first energy metric is equal to or greater than a second energy metric, overwriting the second buffer with the plurality of combined values, wherein the second energy metric corresponds to a previous decoding of the data packet.

Certain aspects of the present disclosure provide an apparatus for wireless communications. The apparatus generally includes means for generating a first plurality of values based on a received data packet, means for combining the first plurality of values with a second plurality of values to generate a plurality of combined values, wherein the plurality of combined values are stored in a first buffer and the second plurality of values are stored in a second buffer, means for determining reliability of the plurality of combined values and the second plurality of values based on a reliability metric, means for overwriting the second buffer with the plurality of combined values if the plurality of combined values are more reliable than the second plurality of values, and means for decoding values stored in the second buffer to determine a plurality of decoded bits corresponding to the received data packet.

Certain aspects of the present disclosure provide an apparatus for wireless communications. The apparatus generally includes means for generating a first plurality of values based on a received data packet, means for combining the first plurality of values with a second plurality of values to generate a plurality of combined values, wherein the plurality of combined values are stored in a first buffer and the second plurality of values are stored in a second buffer, means for decoding the plurality of combined values to determine a first energy metric and a plurality of decoded bits corresponding to the received data packet, and means for overwriting the second buffer with the plurality of combined values if the first energy metric is equal to or greater than a second energy metric, wherein the second energy metric corresponds to a previous decoding of the data packet.

Certain aspects provide a computer-program product for wireless communications, comprising a computer-readable medium having instructions stored thereon, the instructions being executable by one or more processors. The instructions generally include instructions for generating a first plurality of values based on a received data packet, instructions for combining the first plurality of values with a second plurality of values to generate a plurality of combined values, wherein the plurality of combined values are stored in a first buffer and the second plurality of values are stored in a second buffer, instructions for determining reliability of the plurality of combined values and the second plurality of values based on a reliability metric, instructions for overwriting the second buffer with the plurality of combined values if the plurality of combined values are more reliable than the second plurality of values, and instructions for decoding values stored in the second buffer to determine a plurality of decoded bits corresponding to the received data packet.

Certain aspects provide a computer-program product for wireless communications, comprising a computer-readable medium having instructions stored thereon, the instructions being executable by one or more processors. The instructions generally include instructions for generating a first plurality of values based on a received data packet, instructions for combining the first plurality of values with a second plurality of values to generate a plurality of combined values, wherein the plurality of combined values are stored in a first buffer and the second plurality of values are stored in a second buffer, instructions for decoding the plurality of combined values to determine a first energy metric and a plurality of decoded bits corresponding to the received data packet, and instructions for overwriting the second buffer with the plurality of combined values if the first energy metric is equal to or greater than a second energy metric, wherein the second energy metric corresponds to a previous decoding of the data packet.

Certain aspects of the present disclosure provide an apparatus for wireless communications, comprising at least one processor and a memory coupled to the at least one processor. The at least one processor is generally configured to generate a first plurality of values based on a received data packet, combine the first plurality of values with a second plurality of values to generate a plurality of combined values, wherein the plurality of combined values are stored in a first buffer and the second plurality of values are stored in a second buffer, determine reliability of the plurality of combined values and the second plurality of values based on a reliability metric, overwrite the second buffer with the plurality of combined values if the plurality of combined values are more reliable than the second plurality of values, and decode values stored in the second buffer to determine a plurality of decoded bits corresponding to the received data packet.

Certain aspects of the present disclosure provide an apparatus for wireless communications, comprising at least one processor and a memory coupled to the at least one processor. The at least one processor is generally configured to generate a first plurality of values based on a received data packet, combine the first plurality of values with a second plurality of values to generate a plurality of combined values, wherein the plurality of combined values are stored in a first buffer and the second plurality of values are stored in a second buffer, decode the plurality of combined values to determine a first energy metric and a plurality of decoded bits corresponding to the received data packet, and if the first energy metric is equal to or greater than a second energy metric, overwrite the second buffer with the plurality of combined values, wherein the second energy metric corresponds to a previous decoding of the data packet.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA), Time Division Multiple Access (TDMA), Frequency Division Multiple Access (FDMA), Orthogonal Frequency Division Multiple Access (OFDMA), Single Carrier Frequency Division Multiple Access (SC-FDMA) and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
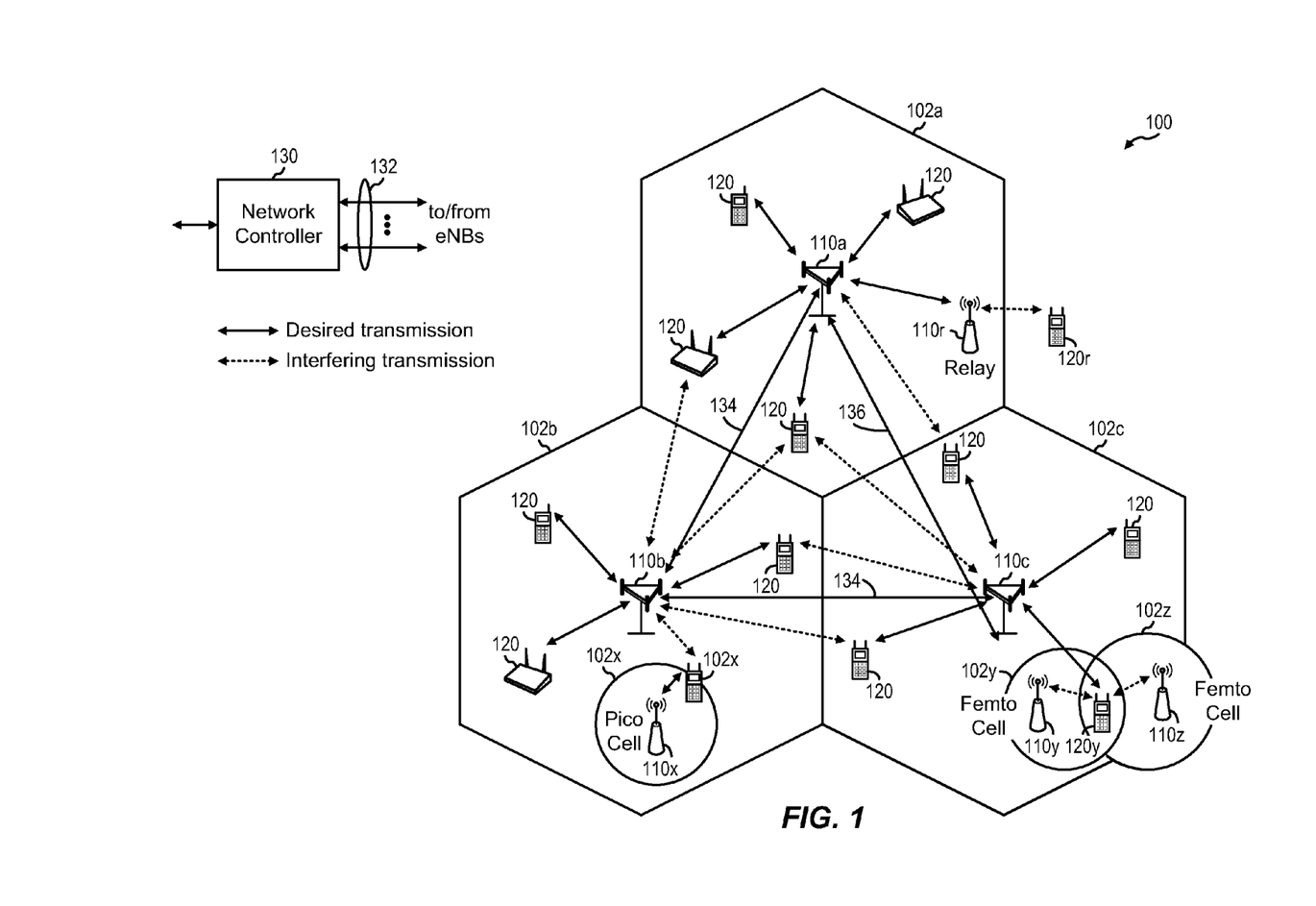
FIG. 1 is a block diagram conceptually illustrating an example of a mobile communication system.

FIG. 1 shows a wireless communication network 100, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cells. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

A network controller 130 may couple to a set of eNBs and provide coordination and control for these eNBs. The network controller 130 may communicate with the eNBs 110 via a backhaul 132. The eNBs 110 may also communicate with one another, e.g., directly or indirectly via a wireless backhaul 134 or a wireline backhaul 136.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.25, 2.5, 5, 10 or 20 MHz, respectively.

Figure 2:
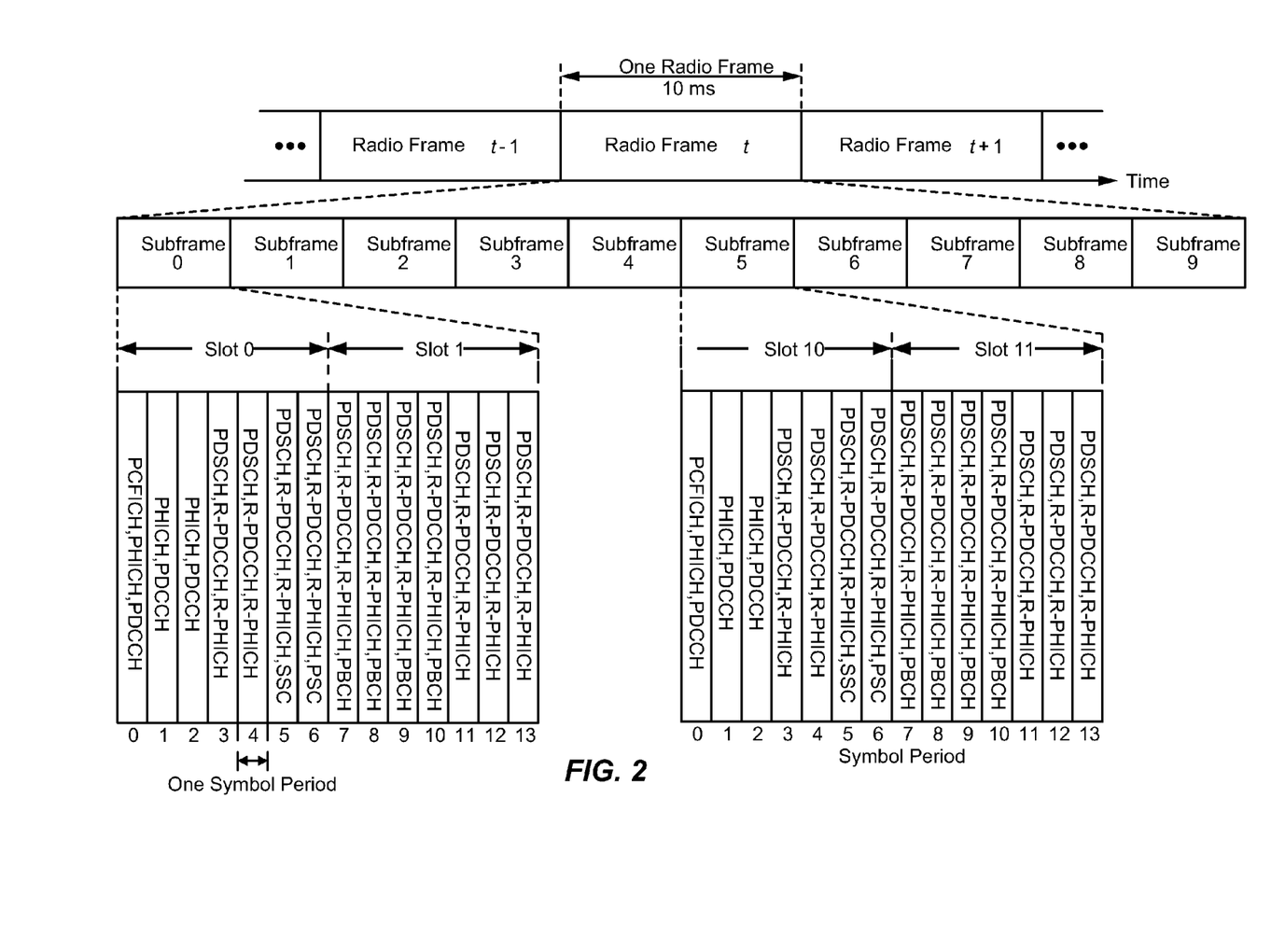
FIG. 2 is a block diagram conceptually illustrating an example of a downlink frame structure in a mobile communication system.

FIG. 2 shows a downlink frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE/-A, an eNB may send a primary synchronization signal (PSS) and a secondary synchronization signal (SSS) for each cell in the eNB on a Primary Synchronization Channel (P-SCH) and a Secondary Synchronization Channel (S-SCH), respectively. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical Hybrid Automatic Repeat Request (HARQ) Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support Hybrid Automatic Repeat Request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

In addition to sending PHICH and PDCCH in the control section of each subframe, e.g., the first symbol period of each subframe, the eNB may also transmit these control-oriented channels in the data portions of each subframe as well. As shown in FIG. 2, these new control designs utilizing the data region, e.g., the Relay-Physical Downlink Control Channel (R-PDCCH) and Relay-Physical HARQ Indicator Channel (R-PHICH) are included in the later symbol periods of each subframe. The R-PDCCH is a new type of control channel utilizing the data region originally developed in the context of half-duplex relay operation. Different from legacy PDCCH and PHICH, which occupy the first several control symbols in one subframe, R-PDCCH and R-PHICH are mapped to resource elements (REs) originally designated as the data region. The new control channel may be in the form of Frequency Division Multiplexing (FDM), Time Division Multiplexing (TDM), or a combination of FDM and TDM.

The eNB may send the P-SCH, S-SCH and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the P-SCH, S-SCH, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), and the like.

Figure 3:
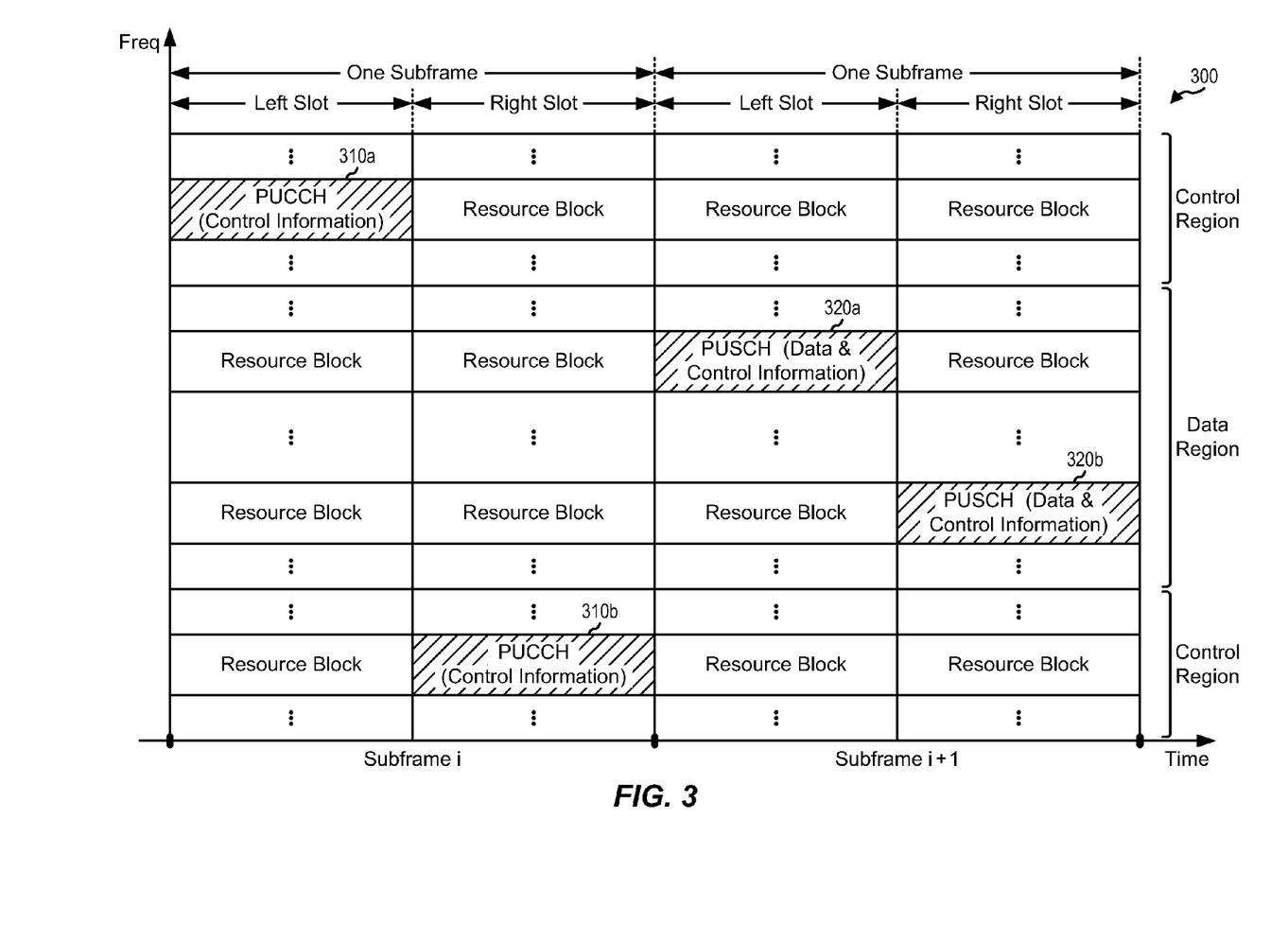
FIG. 3 is a block diagram conceptually illustrating an exemplary frame structure in uplink communications.

FIG. 3 is a block diagram conceptually illustrating one or more portions of an exemplary frame structure 300 in uplink LTE/-A communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the uplink resources. For example, a control and a data channel, parallel control channels, and parallel data channels may be transmitted by a UE.

The PSS, SSS, CRS (common reference signal), PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
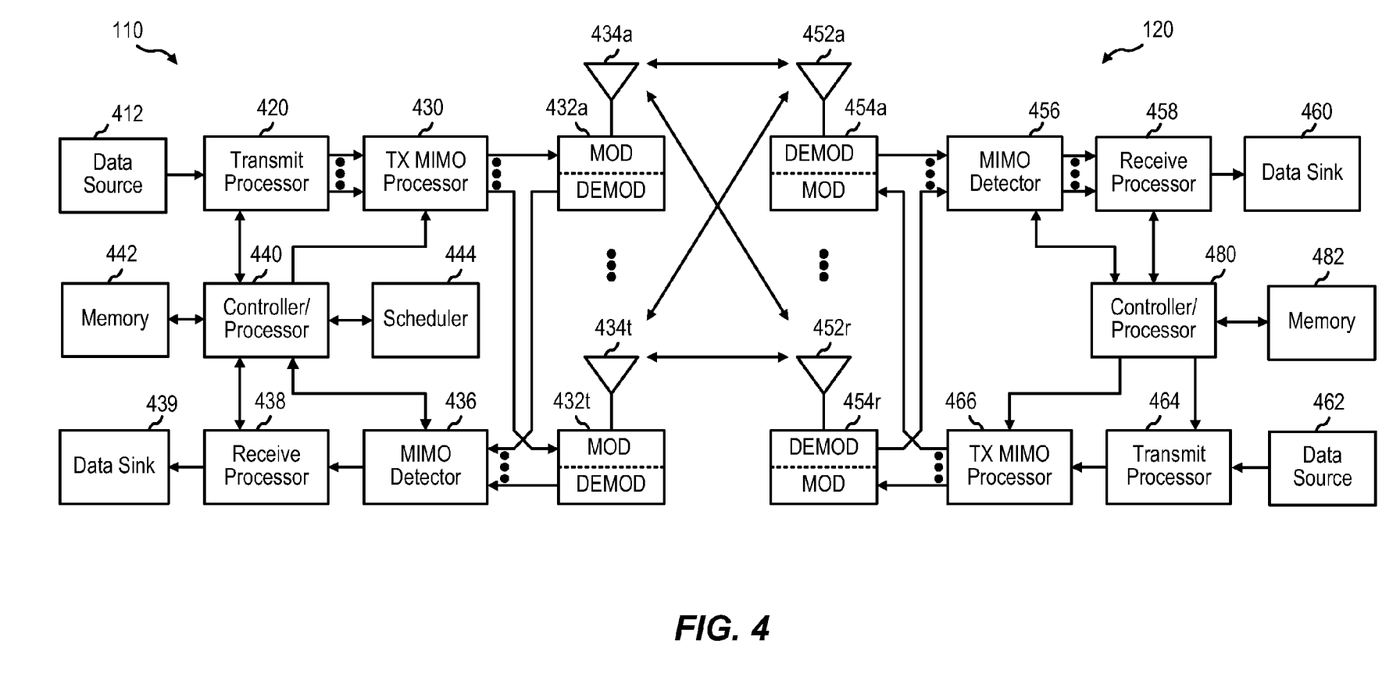
FIG. 4 is a block diagram conceptually illustrating a design of a base station and a user equipment (UE) configured according to one aspect of the present disclosure.

FIG. 4 shows a block diagram of a design of a base station/eNB 110 and a UE 120, which may be one of the base stations/eNBs and one of the UEs in FIG. 1. The base station 110 may be the macro eNB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the base station 110, the uplink signals from the UE 120 may be received by the antennas 434, processed by the modulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks and/or other processes for the techniques described herein. The memories 442 and 482 may store data and program codes for the base station 110 and the UE 120, respectively. A scheduler 444 may schedule UEs for data transmission on the downlink and/or uplink.

In one configuration, the UE 120/eNB 110 configured for wireless communication includes transmitting means and receiving means. In one aspect, the aforementioned means may be the processor(s), the controller/processor 480, the memory 482, the receive processor 458, the MIMO detector 456, the demodulators 454a, and the antennas 452a configured to perform the functions recited by the aforementioned means. In another aspect, the aforementioned means may be a module or any apparatus configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

An Example Method to Improve Retransmission Performance of Data Channels

Certain aspects of the present disclosure provide a system and method for improving performance of HARQ operation in a wireless communication system. The proposed method enables a receiver to update a receive buffer only if newly received values corresponding to a data packet are more reliable than previous values corresponding to the same data packet (that are stored in the receive buffer). The receiver may use the more reliable information (e.g., the newly received values or the previously-stored values) for decoding.

In a wireless communication system such as an LTE/-A system, data packets can be retransmitted, if needed, using hybrid automatic repeat request (HARQ) process. In HARQ operation, a receiver may request retransmission of a data packet if the receiver is unable to successfully retrieve (e.g., detect, decode) the received data packet.

In practice, incorrectly received data packets may be stored at the receiver rather than discarded. When the retransmitted data packet is received, information regarding the newly-received packet may be combined with information stored in a receiver buffer. While it is possible that two given transmissions cannot be independently decoded without error, it may be possible that the combination of the previously erroneously received transmissions gives enough information to the decoder to correctly decode the data packet.

As an example, a Turbo decoder operates on soft values (e.g., log likelihood ratio (LLR) values) of the received signals. For any retransmissions, received LLR values may first be combined (e.g., soft combined) with the existing values that are stored in the LLR buffer from the previous transmissions of the same HARQ process (e.g., for the same data packet). The combined LLRs may then be sent to a decoder (e.g., the Turbo decoder) for data decoding. When the maximum number of retransmission is reached and the receiver is still unable to decode the received packet correctly, the network may start a new transmission.

The decoding success rate is an important performance metric for a communication system. Improving the decoding success rate after HARQ transmissions may improve the overall system performance. As described earlier, combining the LLR values may result in higher chances of correct decoding. However, if the newly received signal is corrupted, the combining procedure may corrupt the LLR values stored in the receiver buffer, and hence degrade performance of the decoding procedure.

For downlink (DL) transmissions, data channel transmission may correspond to a DL control message for the data packet. A UE may first decode the DL control message to acquire control information about a data packet before decoding the data channel. For uplink (UL) transmissions, the UE may first decode an UL grant message on the DL control channel before starting to transmit the data packets on the UL based on the received control information.

Reliability of Retransmission Grant

Successful operation of a HARQ process may rely on reliable communication of the control information. In some scenarios, control channel errors may cause misinterpretation between transmitter and receiver, which may hurt the HARQ operation.

For example, in DL transmissions, a UE may blindly decode the physical downlink control channel (PDCCH) for every subframe. Due to limited cyclic redundancy check (CRC) length, even though the system is able to perform certain amount of pruning to throw away some false CRC grants, it may be very difficult to completely eliminate all the false CRC grants. For any false CRC pass, the UE may mistakenly think that an upcoming transmission (or retransmission) is addressed to it. The UE may then start to combine a signal received at the receiver with existing values that are stored LLR buffer. Since the received signal in fact is not intended for the UE, the LLR buffer may get corrupted.

Similarly, the UE may miss an UL grant for the physical uplink shared channel (PUSCH) retransmission (e.g., either physical downlink control channel (PDCCH) or physical hybrid ARQ indicator channel (PHICH)). As a result, the UE may not transmit any signal. Meanwhile, the eNB may not be aware that the UE is not transmitting. The eNB may start to combine the received signal, which is nothing but noise and interference, with the existing values in a buffer (e.g., the LLR buffer). This may degrade quality of the values in the buffer.

Figure 5:
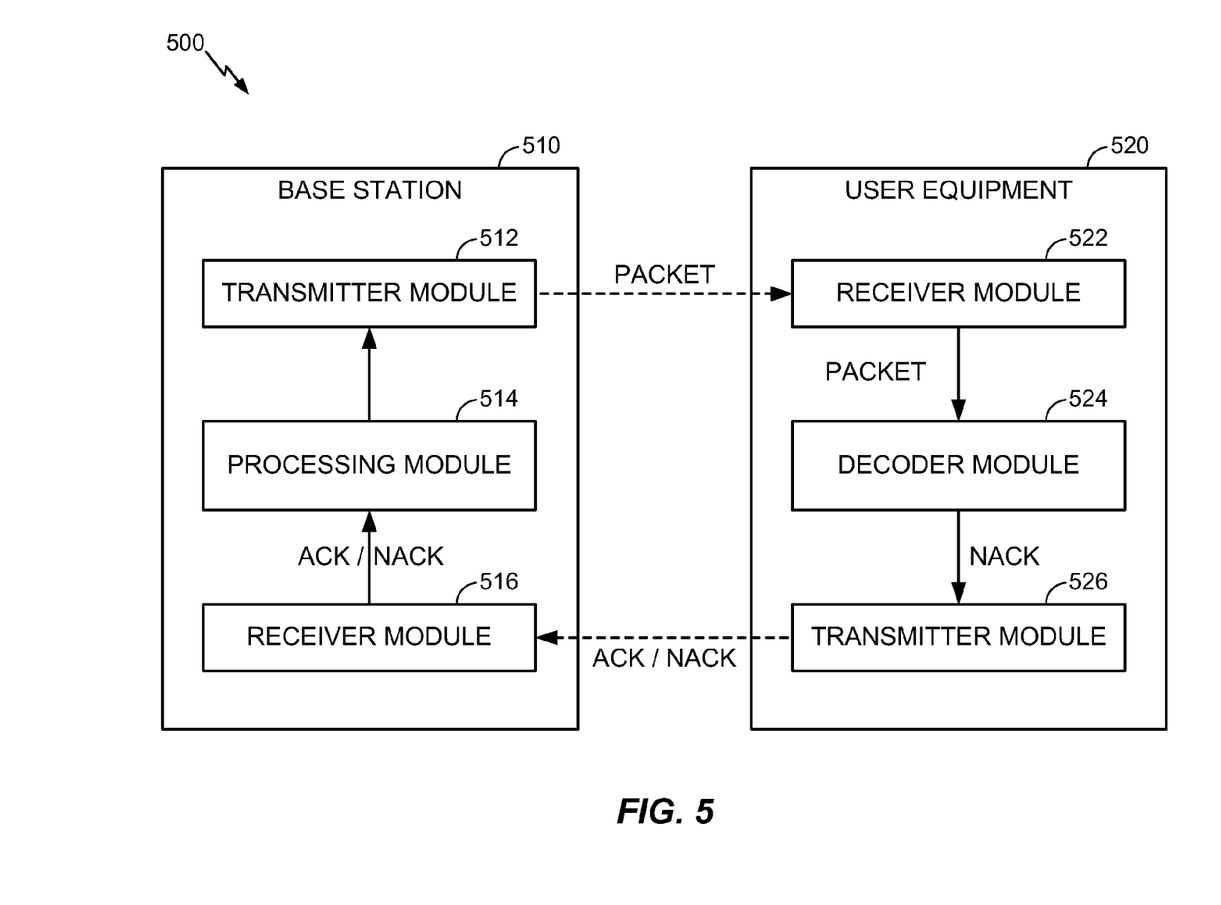
FIG. 5 illustrates an example communication system, in accordance with certain aspects of the present disclosure.

FIG. 5 illustrates an example communication system 500, in accordance with certain aspects of the present disclosure. The communication system 500 includes a base station (e.g., eNB) 510 and a UE 520. The base station includes a transmitter module 512 for transmitting packets to the UE. The UE 520 receives the packet with the receiver module 522. The decoding module 524 decodes the received packet. The UE generates an acknowledgement (ACK) message (e.g., positive or negative acknowledgement (NACK)) to notify the base station of the decoding outcome. The transmitter module 526 transmits the acknowledgement message to the base station 510. The base station receives the acknowledgement message through a receiver module 516, analyzes the message in the processing module 514, and retransmits the same packet if the packet is not decoded successfully at the UE. The base station may also transmit a new packet to the UE 520 if the previous packet was decoded successfully.

If a receiver is unable to decode a received packet correctly, it may request a retransmission of the packet using a HARQ process. Conventional HARQ receivers may perform the following sequence of steps to decode a retransmission of the packet (e.g., that is received in physical downlink shared channel (PDSCH)). First, the receiver may decode control channels to get one or more CRC passed grants. The receiver may then prune control grants to find a grant associated with the HARQ process. Based on the control grant, the receiver may generate soft symbols from the receptions in the data channels. The soft symbols may be accumulated into an existing HARQ buffer. The receiver may then perform decoding based on the values stored in the HARQ buffer. As mentioned earlier, if for any reason the received signal is not reliable, the values in the HARQ buffer get corrupted with the unreliable values. Certain aspects of the present disclosure updates the HARQ buffer only if the received values are reliable (e.g., based on a reliability metric).

Figure 6:
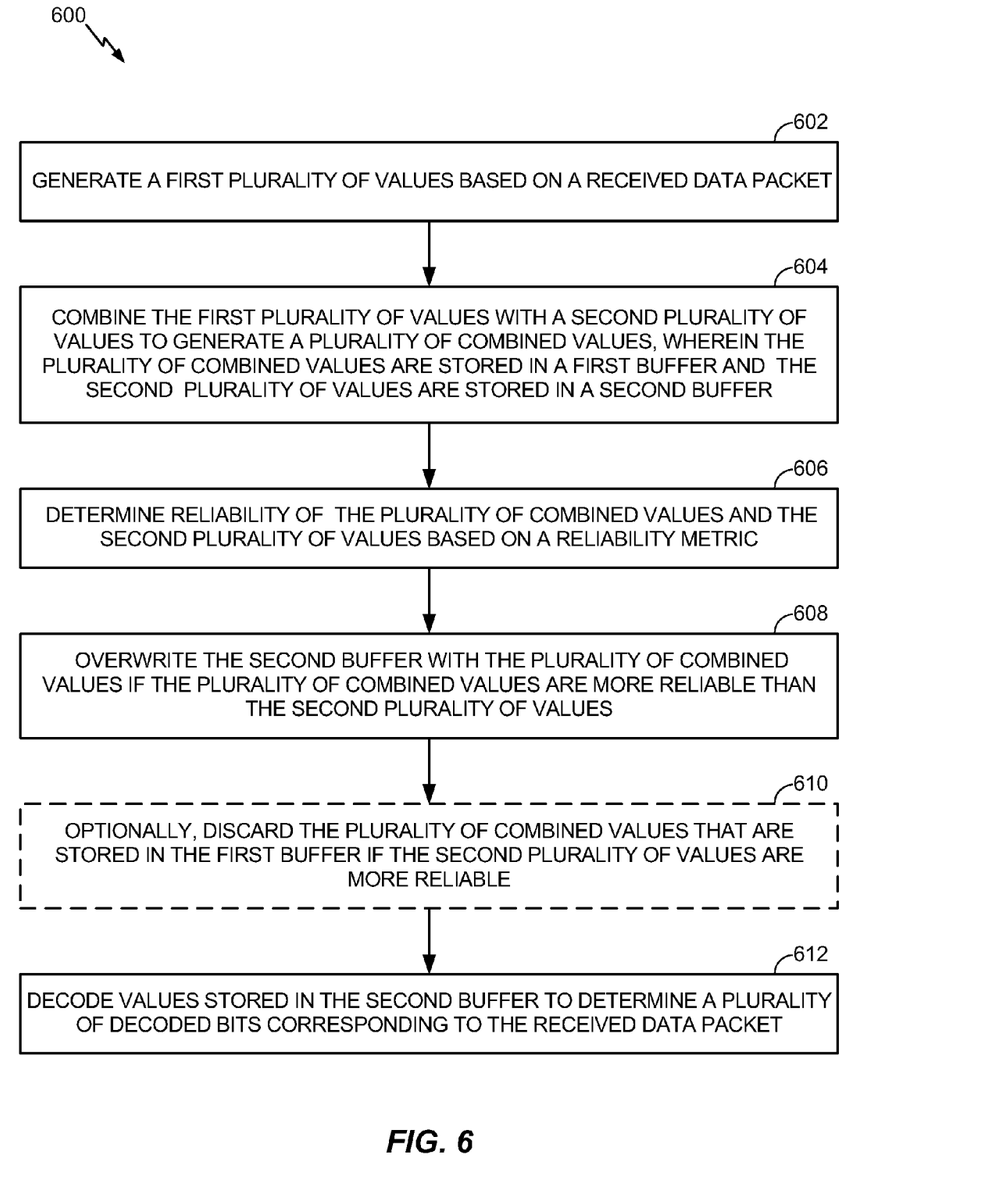
FIG. 6 illustrates example operations that may be performed by a wireless device to improve decoding performance based on a reliability metric, in accordance with certain aspects of the present disclosure.

FIG. 6 illustrates example operations 600 that may be performed by a wireless device to improve decoding performance based on a reliability metric, in accordance with certain aspects of the present disclosure. At 602, the wireless device may generate a first plurality of values based on a received data packet. At 604, the wireless device may combine the first plurality of values with a second plurality of values to generate a plurality of combined values, wherein the plurality of combined values are stored in a first buffer (e.g., HARQ_buffer_new) and the second plurality of values are stored in a second buffer (e.g., HARQ_buffer_old). At 606, the wireless device may determine reliability of the plurality of combined values and the second plurality of values based on a reliability metric. At 608, the wireless device may overwrite the second buffer with the plurality of combined values if the plurality of combined values are more reliable than the second plurality of values. At 610, the wireless device may optionally discard the values in the first buffer if the values in the second buffer are more reliable than the values in the first buffer. At 612, the wireless device may decode values stored in the second buffer to determine a plurality of decoded bits corresponding to the received data packet.

Certain aspects prevent a false control grant from polluting the HARQ buffer by using a new HARQ buffer (e.g., HARQ_buffer_new) in addition to the existing HARQ buffer (e.g., HARQ_buffer_old). Based on the control grant, the receiver may generate soft symbols for the data channel, and soft combine the soft symbols with the values in the existing HARQ buffer (HARQ_buffer_old). The receiver may save the combined values in a temporary HARQ buffer (HARQ_buffer_new). It should be noted that the receiver does not write the combined values in the existing buffer (HARQ_buffer_old) yet. The receiver may then compare the values in the two buffers (e.g., HARQ_buffer_old and the HARQ_buffer_new) to determine which one is more reliable. If there is no improvement in HARQ_buffer_new, the receiver may assume that the control grant is a false grant. The receiver may discard the values in the new buffer (e.g., the soft combined values). If there is an improvement in reliability of the values in the HARQ_buffer_new, the receiver may replace the values in the HARQ_buffer_old with the values in the HARQ_buffer_new and continue to decode these values.

For certain aspects, a receiver may determine reliability of the values in the two buffers (e.g. the HARQ_buffer_old and the HARQ_buffer_new) by using a reliability metric. The reliability metric may be defined in several different ways, all of which fall in the scope of the current disclosure. As an example, the reliability metric may be defined as follows:

$$f(\{r_k\}_{k=0}^{M-1}) = \frac{1}{\sum_{k=0}^{M-1} N_k} \sum_{k=0}^{M-1} g(|r_k|)$$

where $\{r_k\}$ may represent the LLR values in the HARQ buffer with $0 \leq k < M$ as the index of the HARQ buffer entries, M may represent maximum number of entries in the HARQ buffer. $N_k$ may represent number of times that soft values are combined for the LLR value at the k-th entry of the HARQ buffer. Note that $N_k$ might be different from entry to entry. $N_k$ may also be equal to zero for some entries (e.g., depending on the rate-matching algorithm, and how many times HARQ retransmissions have occurred). $g(\bullet)$ may be defined as any monotonically increasing function. For example, $g(\bullet)$ may be defined as $g(x)=x$. This means that absolute values of the LLR values are used to calculate the reliability metric.

As another example, $g(\bullet)$ may be defined as $$g(x) = \begin{cases} x & x > th \\ 0 & x \leq th, \end{cases}$$

in which only LLR values whose absolute values are above certain threshold are considered in calculating the reliability metric. Note that $$\sum_{k=0}^{M-1} N_k$$

can be maintained as a simple counter over the HARQ lifespan of a packet.

Certain aspects of the present disclosure may discard unreliable entries in the buffer based on an energy metric. The proposed scheme may utilize the values in the new buffer to perform decoding, and compare an energy metric of the decoder output with another energy metric from a previous decoding of the same data packet to decide which buffer has more reliable values.

For certain aspects, the receiver may retrieve an energy metric from the decoder (e.g., turbo decoding energy metric from the turbo decoder) and compare the energy metric with an existing energy metric stored in the receiver from a previous HARQ retransmission. If the new energy metric is equal to or larger than the old energy metric (with certain configurable margin), the receiver may claim that the new grant is valid and replace HARQ_buffer_old with HARQ_buffer_new. Otherwise, the receiver may consider that the new grant is a false alarm, discard HARQ_buffer_new and keep HARQ_buffer_old for future HARQ combining.

Figure 7:
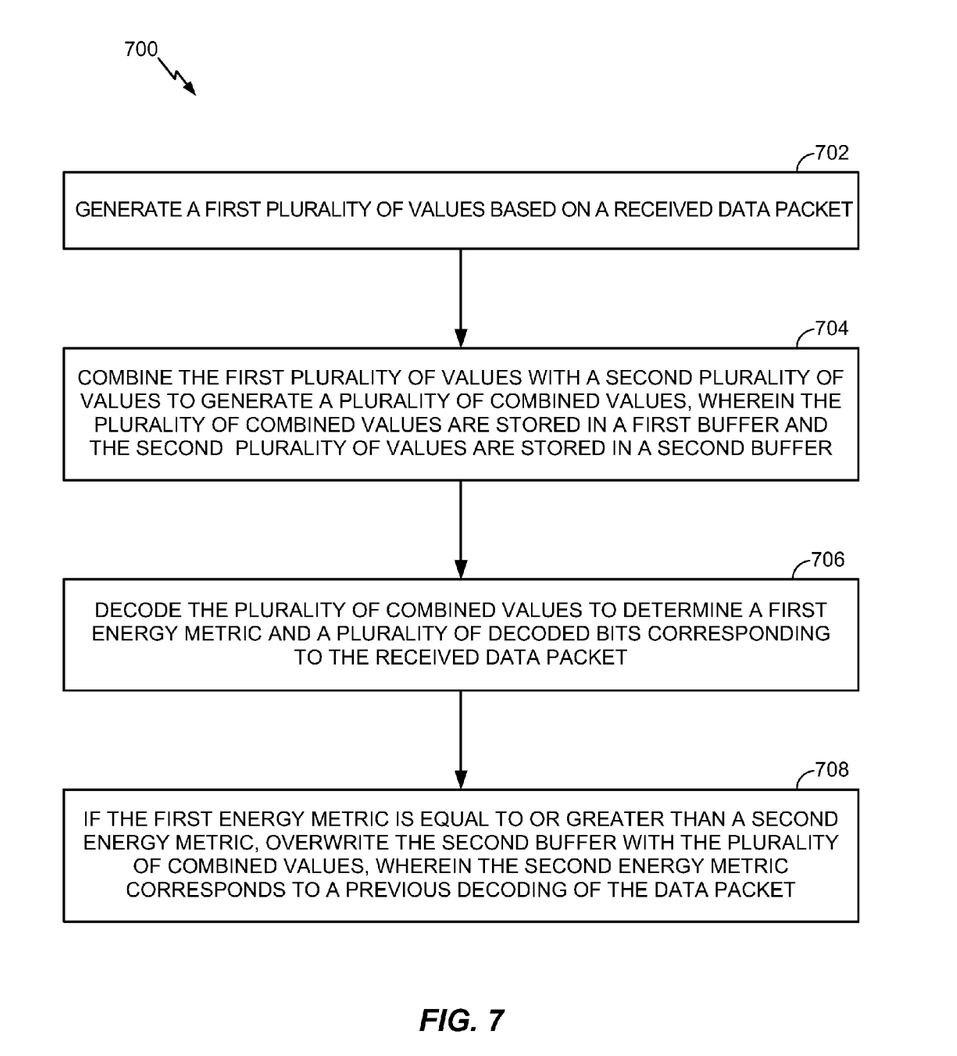
FIG. 7 illustrates example operations that may be performed by a wireless device to improve decoding performance based on an energy metric, in accordance with certain aspects of the present disclosure.

FIG. 7 illustrates example operations 700 that may be performed by a wireless device to improve decoding performance based on the energy metric, in accordance with certain aspects of the present disclosure. At 702, the wireless device may generate a first plurality of values based on a received data packet. At 704, the wireless device may combine the first plurality of values with a second plurality of values to generate a plurality of combined values. The wireless device may store the plurality of combined values in a first buffer (e.g., HARQ_buffer_new). The second plurality of values are stored in a second buffer (e.g., HARQ_buffer_old). At 706, the wireless device may decode the plurality of combined values to determine a first energy metric and a plurality of decoded bits corresponding to the received data packet. At 708, if the first energy metric is equal to or greater than a second energy metric, the wireless device overwrites the second buffer with the plurality of combined values. The second energy metric may correspond to a previous decoding of the data packet.

For certain aspects, both the reliability metric and the energy metric may be used to determine the values in which buffer are more reliable. For example, the values in the HARQ_buffer_new may replace the values in the HARQ_buffer_old if both the reliability metric and the energy metric point out that the values in the HARQ_buffer_new are more reliable than the values in the HARQ_buffer_old. Therefore, the proposed methods, alone or in combination, may be used to determine reliability of newly-received transmissions. The decoder may use more reliable information for decoding or future combining of information corresponding to each data packet.

Figure 8:
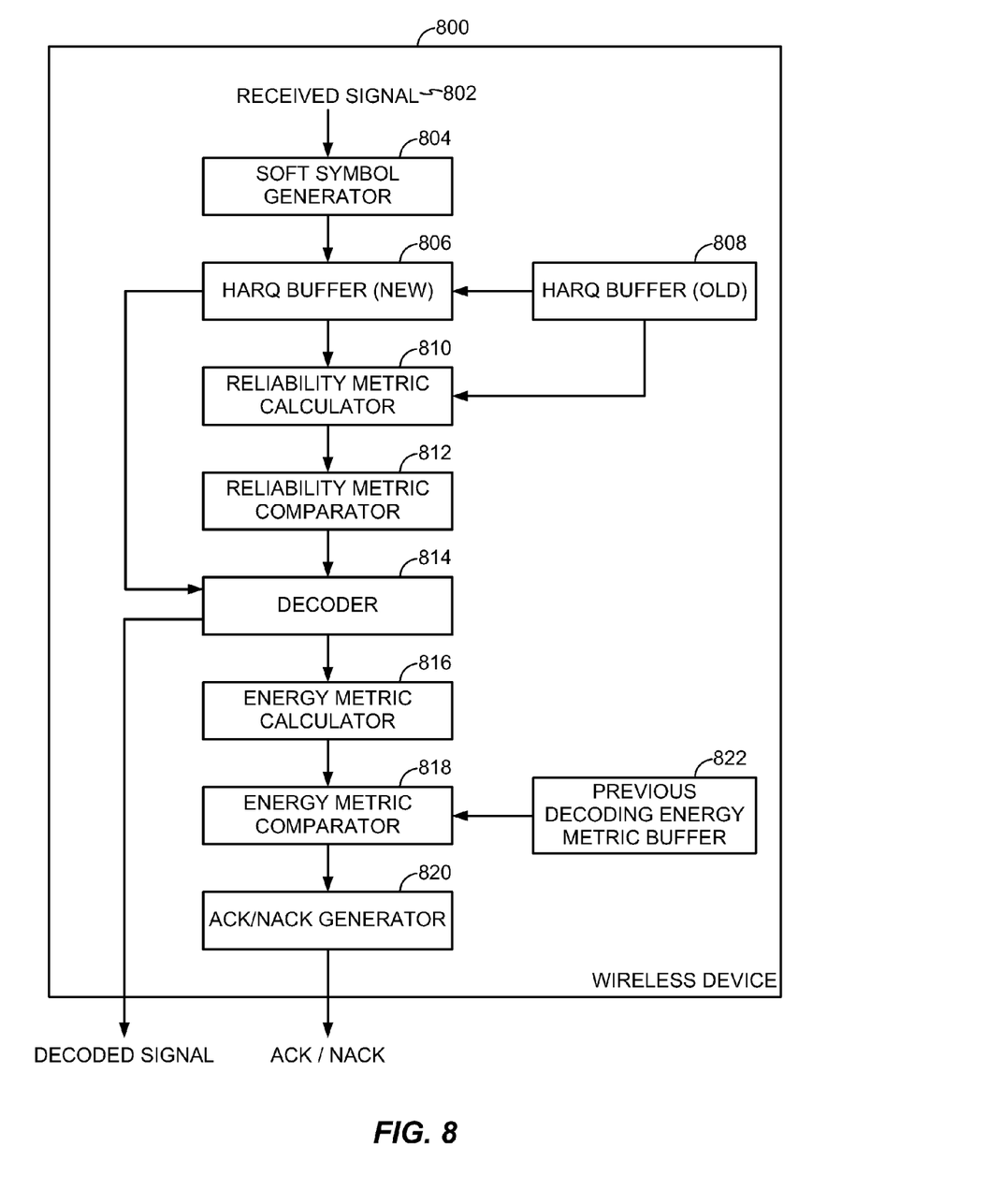
FIG. 8 illustrates an example block diagram of a wireless device, in accordance with certain aspects of the present disclosure.

FIG. 8 illustrates an example block diagram of a wireless device 800, in accordance with certain aspects of the present disclosure. The wireless device may receive a signal 802 and process (e.g., decode) the received signal. The wireless device may include a soft symbol generator 804, a HARQ buffer 806 to store new values, a HARQ buffer 808 to store old values, a reliability metric calculator 810, a reliability metric comparator 812, a decoder 814, an energy metric calculator 816, an energy metric comparator 818, an ACK/NACK generator 820, and a buffer 822 for storing an energy metric of a previous decoding of a packet.

The wireless device 800 may receive a retransmission of a data packet and generate soft symbols using the soft symbol generator 804. The wireless device may then store the generated values in the HARQ buffer 806. The wireless device may calculate reliability metrics for the values in the new HARQ buffer 806 and the old HARQ buffer 808 using the reliability metric calculator 810. The wireless device may compare the reliability metrics using the reliability metric comparator 812. In one example, the wireless device may use the more reliable values stored in the buffers (e.g., new HARQ buffer 806 or old HARQ buffer 808) for decoding with the decoder 814. In another example, the wireless device may use the values stored in the new HARQ buffer 806 for decoding, and generate an energy metric using the energy metric calculator 816. The wireless device may compare the newly calculated energy metric with another energy metric stored in the energy metric buffer 822 to decide which values (e.g., values stored in the new HARQ buffer 806 or stored in the old HARQ buffer 808) are more reliable. The wireless device may generate an acknowledgement message if it is able to successfully decode the packet.

The various operations of methods described above may be performed by any suitable means capable of performing the corresponding functions. The means may include various hardware and/or software component(s) and/or module(s), including, but not limited to a circuit, an application specific integrated circuit (ASIC), or processor.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the phrase "at least one of A or B" is meant to include any combination of A and B. In other words, "at least one of A or B" comprises A or B or A and B.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The techniques provided herein may be utilized in a variety of applications. For certain aspects, the techniques presented herein may be incorporated in an access point station, an access terminal, a mobile handset, or other type of wireless device with processing logic and elements to perform the techniques provided herein.

While the foregoing is directed to aspects of the present disclosure, other and further aspects of the disclosure may be devised without departing from the basic scope thereof, and the scope thereof is determined by the claims that follow.

What is claimed is:

1. A method for wireless communications, comprising:
   generating a first plurality of values based on a received data packet;
   combining the first plurality of values with a second plurality of values to generate a plurality of combined values, wherein the plurality of combined values are stored in a first buffer and the second plurality of values are stored in a second buffer;
   determining reliability of the plurality of combined values and the second plurality of values based on a reliability metric, wherein determining reliability of the plurality of combined values and the second plurality of values based on the reliability metric comprises:
      determining a first reliability value corresponding to the plurality of combined values and a second reliability value corresponding to the second plurality of values based on the reliability metric;
   overwriting the second buffer with the plurality of combined values if the plurality of combined values are more reliable than the second plurality of values; and
   decoding values stored in the second buffer to determine a plurality of decoded bits corresponding to the received data packet.

2. The method of claim 1, wherein the first and the second plurality of values are log likelihood ratio (LLR) values.

3. The method of claim 1, further comprising:
   discarding the plurality of combined values that are stored in the first buffer if the second plurality of values are more reliable.

4. The method of claim 1, wherein the second plurality of values are associated with the received data packet from a previous hybrid automatic repeat request (HARQ) transmission.

5. The method of claim 1, further comprising:
   decoding one or more control channels to get one or more control grants;
   pruning the one or more control grants to obtain a desired control grant associated with a hybrid automatic repeat request (HARQ) process; and
   receiving the received data packet based on the desired control grant.

6. The method of claim 5, wherein the control grants comprise cyclic redundancy check (CRC) passed grants.

7. The method of claim 1, wherein the reliability metric is defined based on one or more values stored in a buffer and a number of times that each of the one or more values are combined with values from previous transmissions of the received data packet in a hybrid automatic repeat request (HARQ) process.

8. The method of claim 1, wherein decoding the values stored in the second buffer comprises:
decoding the values stored in the second buffer using a Turbo decoder.

9. The method of claim 1, wherein the received data packet is a retransmission of a data packet using hybrid automatic repeat request (HARQ).

10. An apparatus for wireless communications, comprising:
means for generating a first plurality of values based on a received data packet;
means for combining the first plurality of values with a second plurality of values to generate a plurality of combined values, wherein the plurality of combined values are stored in a first buffer and the second plurality of values are stored in a second buffer;
means for determining reliability of the plurality of combined values and the second plurality of values based on a reliability metric, wherein the means for determining reliability of the plurality of combined values and the second plurality of values based on the reliability metric comprises:
means for determining a first reliability value corresponding to the plurality of combined values and a second reliability value corresponding to the second plurality of values based on the reliability metric;
means for overwriting the second buffer with the plurality of combined values if the plurality of combined values are more reliable than the second plurality of values; and
means for decoding values stored in the second buffer to determine a plurality of decoded bits corresponding to the received data packet.

11. The apparatus of claim 10, wherein the first and the second plurality of values are log likelihood ratio (LLR) values.

12. The apparatus of claim 10, further comprising:
means for discarding the plurality of combined values that are stored in the first buffer if the second plurality of values are more reliable.

13. The apparatus of claim 10, wherein the second plurality of values are associated with the received data packet from a previous hybrid automatic repeat request (HARQ) transmission.

14. The apparatus of claim 10, further comprising:
means for decoding one or more control channels to get one or more control grants;
means for pruning the one or more control grants to obtain a desired control grant associated with a hybrid automatic repeat request (HARQ) process; and
means for receiving the received data packet based on the desired control grant.

15. The apparatus of claim 14, wherein the control grants comprise cyclic redundancy check (CRC) passed grants.

16. The apparatus of claim 10, wherein the reliability metric is defined based on one or more values stored in a buffer and a number of times that each of the one or more values are combined with values from previous transmissions of the received data packet in a hybrid automatic repeat request (HARQ) process.

17. The apparatus of claim 10, wherein decoding the values stored in the second buffer comprises:
means for decoding the values stored in the second buffer using a Turbo decoder.

18. The apparatus of claim 10, wherein the received data packet is a retransmission of a data packet using hybrid automatic repeat request.

19. A computer-program product for wireless communications, comprising a non-transitory computer readable medium having instructions stored thereon, the instructions being executable by one or more processors and the instructions comprising:
instructions for generating a first plurality of values based on a received data packet;
instructions for combining the first plurality of values with a second plurality of values to generate a plurality of combined values, wherein the plurality of combined values are stored in a first buffer and the second plurality of values are stored in a second buffer;
instructions for determining reliability of the plurality of combined values and the second plurality of values based on a reliability metric, wherein determining reliability of the plurality of combined values and the second plurality of values based on the reliability metric comprises:
determining a first reliability value corresponding to the plurality of combined values and a second reliability value corresponding to the second plurality of values based on the reliability metric;
instructions for overwriting the second buffer with the plurality of combined values if the plurality of combined values are more reliable than the second plurality of values; and
instructions for decoding values stored in the second buffer to determine a plurality of decoded bits corresponding to the received data packet.

20. An apparatus for wireless communications, comprising at least one processor configured to:
generate a first plurality of values based on a received data packet,
combine the first plurality of values with a second plurality of values to generate a plurality of combined values, wherein the plurality of combined values are stored in a first buffer and the second plurality of values are stored in a second buffer,
determine reliability of the plurality of combined values and the second plurality of values based on a reliability metric by determining a first reliability value corresponding to the plurality of combined values and a second reliability value corresponding to the second plurality of values based on the reliability metric;
overwrite the second buffer with the plurality of combined values if the plurality of combined values are more reliable than the second plurality of values, and
decode values stored in the second buffer to determine a plurality of decoded bits corresponding to the received data packet; and
a memory coupled to the at least one processor.

* * * * *